Feb. 14, 1950        H. S. OGDEN        2,497,684
PROTECTIVE SYSTEM FOR DYNAMOELECTRIC MACHINES
Filed Sept. 18, 1947
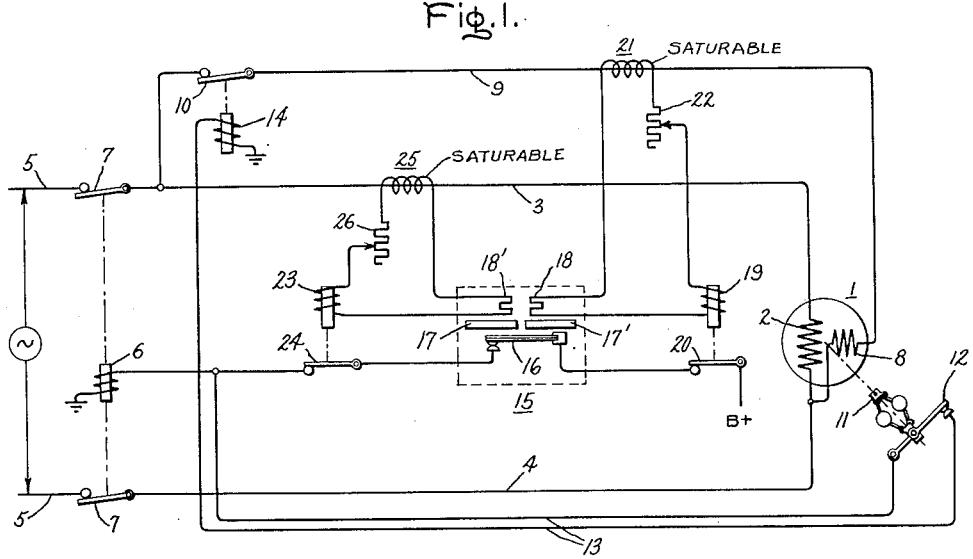
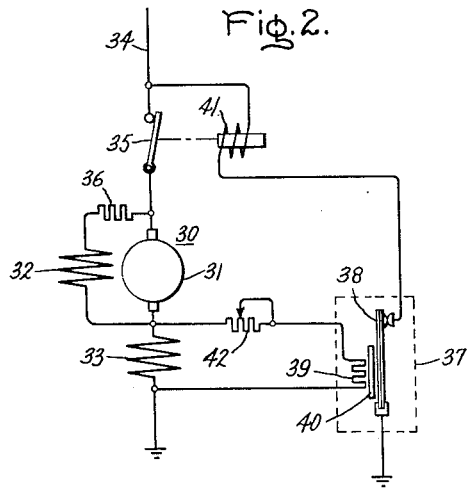
Inventor:
Harold S. Ogden,
by Prowell S. Mack
His Attorney.

Patented Feb. 14, 1950

2,497,684

UNITED STATES PATENT OFFICE 2,497,684

PROTECTIVE SYSTEM FOR DYNAMO-ELECTRIC MACHINES

Harold S. Ogden, Erie, Pa., assignor to General Electric Company, a corporation of New York Application September 18, 1947, Serial No. 774,722

4 Claims. (Cl. 318—221)

My invention relates to a protective system for dynamoelectric machines, and more particularly to a system for protecting electric motors and generators from damage due to excessive current and the heating produced thereby.

The use of thermal element protective relays for dynamoelectric machine applications has been widespread for many years, since the thermal element overload relay provides a time current curve which may be proportioned so that with increasing values of overload current, the time required for the operation of the relay is correspondingly decreased. Thus for overloads of high current, the relay acts much faster to remove the motor from the circuit than in the case of a slight overload.

I have found that the basic type of protective system previously mentioned may be considerably improved by the use of a thermal relay which may have its temperature-time characteristic adjustable so that it may be closely matched to that of the dynamoelectric machine it is designed to protect.

Accordingly, it is an object of my invention to provide an improved protective system for dynamoelectric machines.

It is another object of my invention to provide an improved protective system for electric motors and generators in which the thermal characteristics of the protective device may be closely matched with those of the motor or generator to be protected.

It is a further object of my invention to provide a protective system for alternating current machines which is simple, reliable and easily calibrated to provide maximum protection for any machine, and at the same time the protective element itself is automatically protected from damage by excessive current values.

For a more complete understanding of my invention reference may now be had to the accompanying drawing and to the detailed specification taken in connection therewith. The features of novelty which characterize my invention will be pointed out with particularity in the appended claims. In Fig. 1 of the drawing I have shown diagrammatically a control system, according to my invention, as applied to a split phase alternating current motor provided with a starting winding. Fig. 2 illustrates a modification of my invention as applied to a direct current motor.

Referring to Fig. 1 of the drawing, while I have shown my invention as applied to a single phase dynamoelectric machine, it will be obvious that it is equally applicable to polyphase machines, both motors and generators, and the system may also be designed for motors with or without special starting windings. In Fig. 1 I have shown a split phase alternating current motor 1 having a main running winding 2 supplied with alternating current energy by means of the line conductors 3 and 4 from the alternating current source 5. The electromagnetically-operated line contactor 6 is of the two-pole type having its contacts 7 in series with the A.-C. source 5. For starting the motor 1, an auxiliary or split phase starting winding 8 is provided which is energized by the supply conductor 9 through the electromagnetically-operated starting switch 10. In order to deenergize the starting winding after the motor has accelerated to its proper running speed, a centrifugal device 11 of any convenient type may be employed and for the purposes of illustrating my invention I have shown the device 11 as being of the flyball type. Thus in the position shown in Fig. 1, the motor is assumed to be in the starting condition prior to the time when the speed approaches a value sufficiently high to operate the flyball mechanism. Increase in speed to the rated value opens the contacts 12, thereby interrupting the control circuit 13 to the operating coil 14 of the starting switch 10, opening this switch and deenergizing the starting winding 8.

In order to provide overload protection both during the starting cycle and under normal running conditions, I have provided a double-element thermal relay, shown generally at 15, which includes the bimetallic strip contact member 16, a pair of movable metallic members 17 and 17' for adjusting the thermal capacity of the relay by varying the rate of heat transfer to the bimetallic strip 16, and a pair of resistance-type heaters 18 and 18' positioned in operative relationship with the adjustable thermal masses 17 and 17' and the bimetallic strip contact 16. In practice, the masses 17 and 17' may be metallic blocks, such as copper, which are adjustably secured to the bimetal strip, or positioned in heat exchange relationship between the heaters 18 and 18' and strip 16.

The energizing circuit for the heater 18 for overload protection of the motor 1 during starting includes the thermal relay heating element 18 in series with the operating coil 19 of an instantaneous overload relay 20 and the secondary winding of the saturable current transformer 21 which utilizes a portion of the conductor 9 as its primary. A variable resistance 22 is placed in series with the secondary winding of the saturable transformer 21 for adjusting the resistance of the current transformer secondary circuit to the proper value for obtaining the desired saturating characteristics of the transformer 21.

A substantially similar energizing circuit is employed in connection with the other thermal relay heater 18' which is responsive to current in the main running winding of the motor and which, therefore, assumes complete protective control after the operation of the centrifugal switch 12 has disconnected the starting winding 8 of the motor from the supply circuit 5. The energizing circuit for the heater 18' includes the operating winding 23 of the instantaneous overload relay 24, the secondary winding of a saturable current transformer 25 of which the main line conductor 3 forms the primary winding and an adjustable resistance 26 in series with the transformer secondary and thermal heater for adjusting the resistance of the circuit to the proper value for obtaining desired saturating characteristics of the transformer 25. It will be noticed that the direct current control power circuit, which is utilized for operating the main line contactor 7, includes in series with the operating coil 6 of the line switch 7 the contacts 20 and 24 of the instantaneous overload relays, as well as the bimetallic strip thermally-operated contact 16 of the temperature relay. Thus, operation of either of the instantaneous overload relays 19 or 23 will remove the motor from the power source by deenergizing the operating coil 6 of the main line contactor 7. In a similar manner, operation of the bimetallic contact 16 will also disconnect the motor from the line in the event an overload of insufficient value to trip the instantaneous overload relays 19 or 23 exists for a predetermined period of time.

It is an important element of my invention that the time current characteristic of the thermal relay 15 be carefully adjusted to match the permissible time-current heating characteristic of the dynamoelectric machine 1. Thus, the heating characteristic and consequent time of operation of the bimetallic contact 16, when being heated by the resistance heater 18 upon the occurrence of an overload in the starting circuit, should be carefully calibrated by adjustment of the thermal member 17' to a point where the tripping time of the bimetallic contact 16 is slightly less than the time at which dangerous heating in the starting winding 8 of the motor will occur if the overload is continued. The same relationship should be established for the time-current characteristic of the main running winding 2 of the motor taken in connection with the operating time of the bimetallic contact 16 when energized by an overload in the main supply conductor 3. The use of saturable current transformers 21 and 25 is an important feature since the shape of the conventional saturation curve permits calibration of the relay 15 on a linear or straight line basis up to the knee of the saturation curve, since for all values of primary current the secondary current will be directly proportional. However, in the event of a sustained overload of a value which would cause saturation of the transformer, the decreasing rate of increase of the secondary current due to saturation will effectively prevent abnormally high currents from being circulated in the secondary circuit, with the probability that the heater elements of the relay 15 might be burned out or damaged, or damage might occur to the adjusting resistor. The removal of the motor from the line under conditions of abnormally high overload currents is effectively accomplished by the instantaneous overload relay 19 in the case of an overload in the starting circuit, and by relay 23 in the case of an overload during running conditions. Thus, the current value necessary to energize the relays 19 and 23 should be adjusted so that operation of the relays will take place approximately above the knee of the saturation curve, or at the point where pronounced saturation of the transformer begins to take effect. By means of the combined adjusting features, namely the adjusting resistances 22 and 26 and the adjustable thermal masses 17 and 17', the heat-time characteristic and thermal capacity of the relay 15 may be closely adjusted and calibrated to match the heating characteristics of the starting and running windings of the motor 1. It is apparent that the same arrangement may be applied to a polyphase A.-C. motor or generator where it would be desirable to remove the machine from the line in the event of excessive line current in any phase. In this case, any desired number of saturable current transformers and associated relay heaters would be provided which would be responsive to current in the lines or phases for which protection is desired.

Fig. 2 shows a modification of my protective system as applied to a direct current machine which includes an armature 31, a shunt field winding 32 and a series or compensating field winding 33. Direct current energy is supplied to the direct current machine through conductor 34, the main line switch 35 and through the return grounded circuit, as shown. The customary field resistance 36 is included in series with the shunt field winding 32. As in the system shown in Fig. 1, a thermal relay 37 is provided which includes the bimetallic strip contact member 38 and a heating coil 39 therefor, together with an adjustable thermal mass 40 for varying the heat-time characteristic of the relay 37. The bimetallic contact 38 is in series with the operating coil 41 of the main line contactor 35, and this combination is across the main source of direct current power so that with the circuit components in the position as shown in Fig. 2, the motor is assumed to be running normally with the bimetallic thermal relay 37 closed and the main line contactor picked up due to energization of its operating coil 41. In order to provide an energizing source for the heater element 39, it is convenient to use the voltage drop across the series field winding 33 which may be a straight series field or commutating or compensating field winding, or, if desired, can be an ordinary heavy duty resistance in series circuit relationship with the motor armature. Thus an energizing current for the heater 39 is provided which is directly proportional to the current flowing in the motor armature for which overload protection is desired, and an adjustable resistance 42 is placed in series with the heater element 39 for calibrating the heater so that its operation will be matched to the heating characteristics of the motor armature 31. The provision of the adjustable thermal mass 40 allows very close matching of the heating characteristics of the bimetallic element 38 with the maximum permissible current time heating characteristic of the motor, and together with the adjusting resistance 42 a closely matched and effectively operating overload protection system may be obtained. It will be apparent, of course, that if desired an instantaneous overload relay of the type usually provided in direct current systems can also be employed, as shown in Fig. 1, if deemed necessary.

With regard to both Figs. 1 and 2, my protective system has the further advantage that the operator is automatically prevented from attempting to restart the motor or replace a generator on the line immediately after it has been removed from the line due to an overload in either the starting or running condition. The natural period of cooling of the heater element, thermal mass and bimetallic strip thus imposes a time delay before the bimetallic contact member has cooled to a point where contact is again made and the main line switch energizing circuit is completed. Thus, it is impossible for the operator to attempt a series of repetitive applications of the starting process without making any attempt to ascertain the reason for the overload which, in the case where such protection is not provided, might result in serious damage by excess heating to the machine insulation and windings by repeated applications of overload current.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. An electrical control system for an alternating current motor having a starting and a running winding comprising, switching means for connecting said windings to a source of power, a single thermal relay means for operating said switching means, a plurality of heater elements for said relay means, means for energizing one of said heater elements nonlinearly in response to current in one of said motor windings, means for energizing the other of said heater elements non-linearly in response to current in the other of said motor windings each of said last named means including a saturable current transformer in circuit with the respective heater element, and speed responsive means for disconnecting said starting winding from said source of power upon attainment of a definite rotation speed of said motor.

2. An electrical control system for an alternating current motor having a starting and a running winding comprising, switching means for connecting said windings to a source of power, thermally responsive relay means for operating said switching means, a pair of heater elements for said relay means, means for energizing one of said heater elements nonlinearly in response to current in said motor starting winding, means for energizing said other heater element non-linearly in response to current in said motor running winding, both of said energizing means including a saturable current transformer in circuit with each of the respective heater elements, and an adjustable thermal storage member for varying the rate of heat transfer from said heater elements to said relay means.

3. An electrical control system for an alternating current motor having a starting and a running winding comprising, switching means for connecting said windings to a source of power, thermally responsive relay means for operating said switching means including a bimetallic contact making member, a pair of heater elements for said bimetallic member, means including an adjusting rheostat for energizing one of said heater elements nonlinearly in response to current in said motor running winding, means including a separate adjusting rheostat for energizing the other of said heater elements nonlinearly in response to current in said motor starting winding, each of said energizing means including a separate saturable current transformer in circuit with the respective heater element, and an adjustable thermal storage member for said bimetallic member for varying the thermal capacity of said relay and its heat-time characteristic.

4. A protective system for a polyphase alternating current dynamoelectric machine connected to a power circuit for receiving electrical energy therefrom or transmitting electrical energy thereto comprising, a plurality of windings for said machine, switching means for connecting said machine windings to said circuit, a thermal relay associated with each of said windings including a heater element for each relay, means including a rheostat and a saturable current transformer for each relay for supplying an energizing current to each of said heater elements which is a nonlinear function of the current in said main windings, adjustable thermal means interposed between said heaters and the associated relay for varying the rate of heat transfer to said relays, and a control circuit interconnecting said relay and said switching means for operating said switching means to disconnect said dynamoelectric machine from said power circuit upon operation of any of said relays in response to current in one of said windings in excess of a predetermined value.

HAROLD S. OGDEN.

REFERENCES CITED

The following references are of record in the file of this patent:

UNITED STATES PATENTS

| Number | Name | Date |
|---|---|---|
| 1,696,289 | Wood | Dec. 25, 1928 |
| 1,699,752 | Randall | Jan. 22, 1929 |
| 1,728,038 | Burstyn | Sept. 10, 1929 |
| 1,997,673 | Boothby | Apr. 16, 1935 |
| 2,338,515 | Johns | Jan. 4, 1944 |
| 2,339,618 | Crago | Jan. 18, 1944 |
| 2,363,310 | Fritz | Nov. 21, 1944 |
| 2,468,693 | Stoecklin et al. | Apr. 26, 1949 |

FOREIGN PATENTS

| Number | Country | Date |
|---|---|---|
| 309,895 | Germany | Dec. 21, 1918 |